United States Patent [19]

Penwill

[11] Patent Number: 5,337,048
[45] Date of Patent: Aug. 9, 1994

[54] IMPROVED HEAD-UP DISPLAY PITCH BAR SYSTEM FOR AIRCRAFT

[75] Inventor: John C. Penwill, Bedford, United Kingdom

[73] Assignee: The Secretary of State for Defence in Her Britannic Majesty's Government of the United Kingdom of Great Britain and Northern Ireland, Hants, England

[21] Appl. No.: 971,826
[22] PCT Filed: Jul. 19, 1990
[86] PCT No.: PCT/GB90/01107
  § 371 Date: Feb. 17, 1993
  § 102(e) Date: Feb. 17, 1993
[87] PCT Pub. No.: WO92/01906
  PCT Pub. Date: Feb. 6, 1992
[51] Int. Cl.$^5$ ............................................. G01C 23/00
[52] U.S. Cl. ................................... 340/975; 340/974; 340/980
[58] Field of Search ............... 340/974, 975, 973, 971, 340/968, 980; 364/434, 435; 33/328, 330

[56] References Cited

U.S. PATENT DOCUMENTS

| | | | |
|---|---|---|---|
| 4,305,057 | 12/1981 | Rolston | 340/974 |
| 4,513,509 | 4/1985 | Nordström | 340/974 |
| 4,825,194 | 4/1989 | Rasinski | 340/974 |
| 4,860,007 | 8/1989 | Konicke et al. | 340/973 |
| 4,910,513 | 3/1990 | Kelly et al. | 340/975 |
| 4,977,401 | 12/1990 | Sjöberg | 340/975 |

FOREIGN PATENT DOCUMENTS

WO86/06160 10/1986 France .
2179612A 3/1987 United Kingdom .

Primary Examiner—Brent Swarthout
Attorney, Agent, or Firm—Nixon & Vanderhye

[57] ABSTRACT

A head-up display system includes means generating a pitch ladder pattern having pitch bars which are straight lines with a central gap, the pitch bars representing climb angles being solid lines and the pitch bars representing dive angles being dashed lines, the pattern having a scale factor which is unity in a central region and which increases smoothly from the central region towards the extremes of the pattern, characterised in that: a) the central bar representing level flight is considerably longer than any other bar, and the lengths of the bars decrease according to a relationship with their displacement from the central bar; b) the zenith or 90° climb angle is indicated by a distinctive star symbol and the nadir or 90° dive angle is indicated by a distinctive earth symbol, and c) the pattern has two inner regions on either side of the central region, and two outer regions between the inner regions and zenith and nadir respectively, and the graduation intervals in the outer regions are considerably greater than the graduation intervals in the inner regions, so that the first graduation interval in each outer region is considerably wider than the last graduation interval in each inner region, thus providing distinctive indications of the angles at which the inner regions end and the outer regions begin.

7 Claims, 2 Drawing Sheets

IMPROVED HEAD-UP DISPLAY PITCH BAR SYSTEM FOR AIRCRAFT

BACKGROUND OF THE INVENTION

1. Field of the Invention

This invention relates to head-up display systems for aircraft.

2. Discussion of Prior Art

Known head-up display systems present an aircraft symbol and a pitch ladder display. The pitch ladder is a pattern of bars, each drawn (subject to inaccuracies resulting from the sensors and instrumentation) parallel to the actual horizon and forming a scale against which the position of the aircraft symbol indicates a measure of the altitude (pitch) or climb or dive angle of the aircraft. A central bar in the pattern represents zero climb/dive angle in level flight, and it should overlay the actual horizon as seen through the display whenever the horizon comes within the field of view of the display. It follows that the pattern must be tilted, with respect to the display centerline, by minus the bank angle of the aircraft, and the pattern center so placed that the aircraft symbol position gives the desired climb or dive angle measurement when read against the scale formed by the pitch bars. Only a portion of the pattern will be displayed within the field of view at any instant.

In conditions of poor visibility or in aerobatic maneuvers or high turbulence, climb-or-dive angle information is of vital importance. It is of particular importance that whenever the pilot returns his attention to the display after having any distraction or task requiring him to look elsewhere or after any violent maneuver, the display will give him an immediate and accurate appreciation of the bank angle and climb-or-dive angle presented so as to minimize any possibilities of misinterpretation.

The actual horizon, or the central horizon bar in the pitch ladder naturally forms a particularly useful indication by which the pilot can judge the climb-or-dive angle of his flight, but in a climb-or-dive it will soon disappear from the field of view.

When the climb-or-dive angle changes rapidly the bars in a conventional pitch ladder may appear to be written as multiple images and may all too easily be confused. To reduce these difficulties it was suggested in patent GB2179612B that the spacing of the pitch bars should be varied. The present invention is an improvement on the invention of this patent.

SUMMARY OF THE INVENTION

It is an object of the invention to provide a head-up display system to provide the pilot with very clear analog indications of climb-dive angle which can be immediately appreciated and also to provide a particular indication of chosen climb-or-dive angles $\pm\phi_1$ which will be useful as references against which climb-or-dive angles may be judged.

According to the present invention a head-up display system includes means for generating a pitch ladder pattern having pitch bars which are straight lines with a central gap, the pitch bars representing climb angles being solid lines and the pitch bars representing dive angles being dashed lines, the pattern having a scale which is unity in a central region and which decreases smoothly from the central region towards the extremes of the pattern, characterized in that:

a. the central bar representing level flight is considerably longer than any other bar, and the lengths of the bars decrease according to a relationship with their displacement from the central bar;

b. the zenith or 90° climb angle is indicated by a distinctive star symbol and the nadir or 90° dive angle is indicated by a distinctive earth symbol, and c. the pattern has two inner regions on either side of the central region, and two outer regions between the inner regions and zenith and nadir respectively, and the graduation intervals in the outer regions are considerably greater than the graduation intervals in the inner regions, so that the first graduation interval in each outer region is considerably wider than the last graduation interval in each inner region, thus providing distinctive indications of the angles at which the inner regions end and the outer regions begin.

Preferably the zenith star symbol is shown in outline only, and the earth symbol is a circle filled by shading lines.

Preferably the central region extends to $\pm 5°$ and the inner regions extend to $\pm 30°$.

Preferably the graduation intervals in the outer regions are twice as large as the graduation intervals in the inner regions.

Preferably the scale of the display (by which is meant the separation of two display values compared with the corresponding angle subtended at the pilot's eye position) decreases smoothly from unity at the edge of the central region to a value in the range of 1:4.4 to 1:5 at the zenith and nadir.

BRIEF DESCRIPTION OF THE DRAWINGS

An embodiment of the invention will now be described with reference to the drawings of which

DETAILED DESCRIPTION OF PREFERRED EMBODIMENTS

Figure 1:
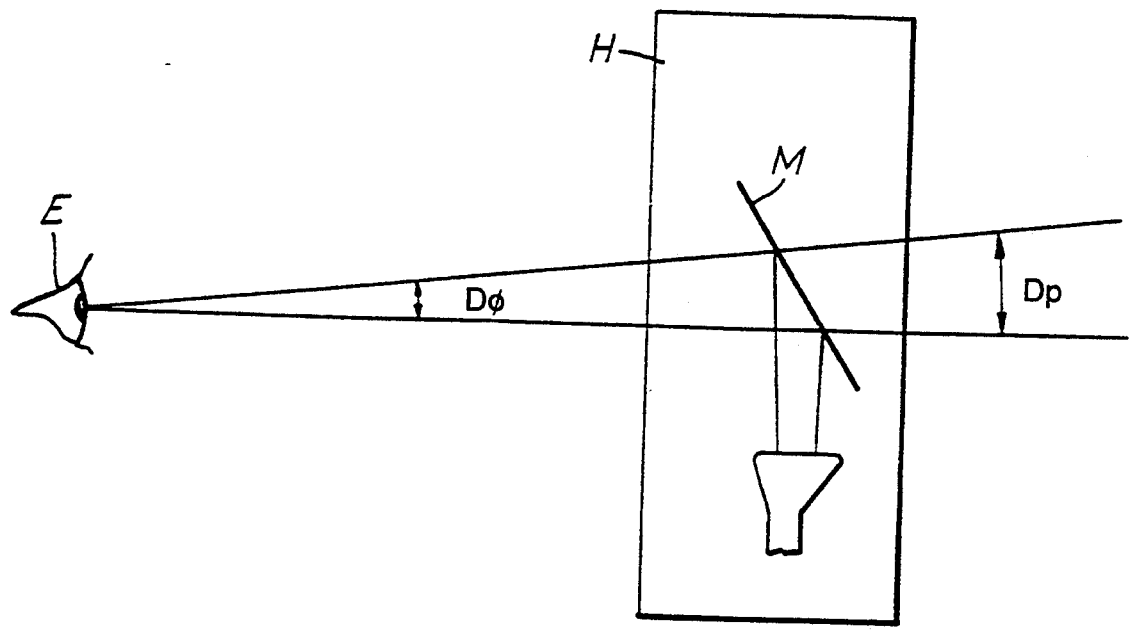
FIG. 1 is a side elevation showing sight lines through the head-up display and FIG. 2 is a drawing of the preferred form of the whole pitch ladder pattern.

FIG. 1 shows the pilot's eye E and his sight lines to and through the mirror M of a head-up display unit H in a condition of near-level flight. Here an increment of climb-dive angle $D_\phi$ is represented by a distance between bars in the central region of the pitch ladder, and the angle $D_p$ subtended at the pilot's eye by this distance, is equal to the increment $D_\phi$. One of the sight-lines may be the sight-line to the horizon and as shown it should overlay the pilot's view of the actual horizon, within limits due to inaccuracies of sensors and instrumentation. Outside the central region the angle $D_p$ would be smaller than $D_\phi$ according to the scale factor. Near zenith or nadir $D_p$ would be approximately one quarter of $D_\phi$.

Figure 2:
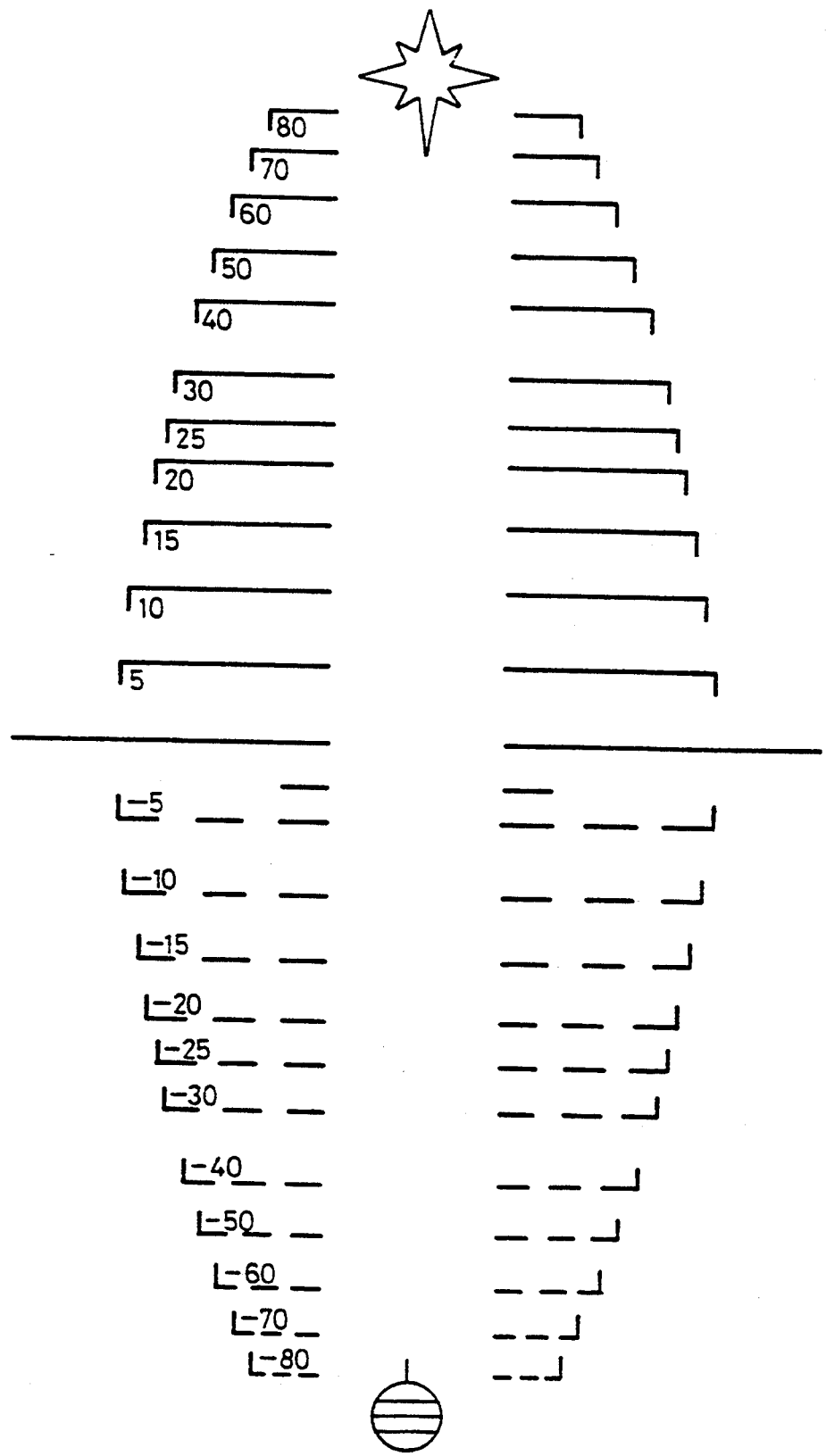

FIG. 2 shows the preferred form for the whole pattern. It should be noted that only a part of this pattern will be shown in the field of view of the display at any instant, and it will be displayed on a much larger scale than it is shown in FIG. 2. The short bars just below the horizon bar are advisory descent angle markers at $\phi = -3°$. The other pitch bars have horizon pointing legs on their outer ends, and are labelled on the lefthand end only with the climb-or-dive angles which they indicate. The pitch ladder pattern is generated by suitable graphics generation software in a suitable computer and is positioned on the head-up display so that it forms a scale of climb-dive angle against which an aircraft symbol indicates the climb-dive angle in steady flight. Preferably the positioning of the pitch ladder display is controlled as specified in a copending application U.S. Ser. No. 07/971,824 filed on the same day as this application. In the inner regions of the pitch ladder pattern from ±5° to ±30° pitch bars are provided at every 5°. In the outer regions beyond ±30° there are bars at every 10°. In consequence there is a distinctively large spacing between the 30° and 40° bars, and this will be even more apparent in an actual display than it is in FIG. 2. It might be thought that this could lead to confusion, because this will be similar to the spacing between the 5° and 10° bars, but in practice there is no possibility of confusion because the pilot has other cues. In particular he will feel the forces of gravity and acceleration, which at climb-or-dive angles of ±30° will be so different from the effects or feel of near-level flight that there will be no chance of confusion. The distinctive gaps created by the large change in graduation interval therefore have no adverse effects and have a non-obvious advantage in that they provide an extra guideline which can be used like a secondary artificial "horizon" to judge climb-or-dive angles when the actual horizon and the horizon bar are outside the field of view.

The scale of the display varies from the horizon bar towards the zenith and nadir in accordance with the following relationship:

Pitch bar displacement = $f(\Phi)$ (measured in terms of the angle subtended at the pilot's eye position)

$$\begin{aligned} f(\phi) &= \phi \text{ for } -5 < \phi < +5° \\ &= 5 + 25 \log_e (0.8 + 0.04\phi) \text{ for } \phi > 5° \\ &= -5 - 25 \log_e (0.8 - 0.04\phi) \text{ for } \phi < -5° \end{aligned}$$

I claim:

1. A head-up display system including means for generating a pitch ladder pattern having pitch bars which are straight lines with a central gap, the pitch bars representing climb angles being solid lines and the pitch bars representing dive angles being dashed lines, the display having a scale which is unity in a central region and which decreases smoothly from the central region towards the extremes of the pattern, said pattern including:
   a. a central pitch bar representing level flight is considerably longer than any other pitch bar, and the lengths of the pitch bars decrease according to a relationship with their displacement from the central bar;
   b. a 90° climb angle is indicated by a distinctive star symbol and a 90° dive angle is indicated by a distinctive earth symbol, and
   c. the pattern has two inner regions on either side of the central region, and two outer regions between the inner regions and the star symbol and the earth symbol, respectively, and graduation intervals between pitch bars in the outer regions are considerably greater than graduation intervals between pitch bars in the inner regions, so that the first graduation interval in each outer region is considerably wider than the last graduation interval in each inner region, thus providing distinctive indications of the angles at which the inner regions end and the outer regions begin.

2. A head-up display system as claimed in claim 1 wherein the star symbol is shown in outline only, and the earth symbol is a circle filled by shading lines.

3. A head-up display system as claimed in claim 1 wherein the central region extends to ±5° and the inner regions extend to ±30°.

4. A head-up display system as claimed in claim 1 wherein the graduation intervals in the outer regions are twice as large as the graduation intervals in the inner regions.

5. A head-up display system as claimed in claim 1 wherein the scale of the display varies from unity at the edge of the central region to a value in the range of 4.4:1 to 5:1 at the star and earth symbols.

6. A head-up display system as claimed in claim 1 wherein the lengths of the pitch bars decrease according to a linear relationship with the modulus of the climb or dive angle which they represent.

7. A head-up display system as claimed in claim 6 wherein the ±80° bars are about one quarter of the length of the ±5° bars.

* * * * *